United States Patent
Hori

(10) Patent No.: US 11,560,145 B2
(45) Date of Patent: Jan. 24, 2023

(54) TRAVEL PATH RECOGNITION APPARATUS AND TRAVEL PATH RECOGNITION METHOD

(71) Applicant: Mitsubishi Electric Corporation, Tokyo (JP)

(72) Inventor: Yasuyoshi Hori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 89 days.

(21) Appl. No.: 16/474,333

(22) PCT Filed: Jan. 10, 2017

(86) PCT No.: PCT/JP2017/000405
§ 371 (c)(1),
(2) Date: Jun. 27, 2019

(87) PCT Pub. No.: WO2018/131062
PCT Pub. Date: Jul. 19, 2018

(65) Prior Publication Data
US 2019/0351901 A1 Nov. 21, 2019

(51) Int. Cl.
*B60W 30/12* (2020.01)
*G01C 21/14* (2006.01)
*G06V 20/56* (2022.01)

(52) U.S. Cl.
CPC ............ *B60W 30/12* (2013.01); *G01C 21/14* (2013.01); *G06V 20/588* (2022.01)

(58) Field of Classification Search
CPC .. B60W 30/12; B60W 2552/30; B60W 40/04; B60W 40/06; G01C 21/14;
(Continued)

(56) References Cited

U.S. PATENT DOCUMENTS 3,657,821 A * 4/1972 De Nure ............... B60W 30/12
33/263
5,485,378 A * 1/1996 Franke ................. B62D 15/025
348/118
(Continued)

FOREIGN PATENT DOCUMENTS

DE 10 2005 025 387 A1 5/2006
DE 10 2010 053 964 A1 8/2011
(Continued)

OTHER PUBLICATIONS

Communication dated Mar. 13, 2020, from the European Patent Office in European Application No. 17891437.0.
(Continued)

*Primary Examiner* — Thomas Ingram
(74) *Attorney, Agent, or Firm* — Sughrue Mion, PLLC; Richard C. Turner

(57) ABSTRACT

An object is to provide technology capable of appropriately recognizing a travel path. A travel path recognition apparatus includes a travel path recognizer. The travel path recognizer calculates a traveling distance traveled by a vehicle from acquisition time of lane marking information to current time based on a vehicle speed of vehicle behavior. Then, the travel path recognizer determines whether or not the lane marking information is information within a usable period in which the lane marking information is usable to recognize the travel path based on a predetermined lane marking acquirable distance and the traveling distance. The predetermined lane marking acquirable distance is a distance in front of a position of the vehicle, and is a distance in which a lane marking of the lane marking information is acquirable.

11 Claims, 6 Drawing Sheets

(58) Field of Classification Search
CPC .... G06K 9/00798; G06V 20/588; G06T 7/60; G08G 1/16
See application file for complete search history.

(56) References Cited

U.S. PATENT DOCUMENTS

| | | | | |
|---|---|---|---|---|
| 9,555,803 | B2* | 1/2017 | Pawlicki | G01S 11/12 |
| 10,360,460 | B2* | 7/2019 | Jiang | B60W 30/12 |
| 2009/0174577 | A1* | 7/2009 | Nakamura | G06K 9/00798 340/995.1 |
| 2010/0309674 | A1* | 12/2010 | Su | B60Q 1/115 362/466 |
| 2013/0274959 | A1* | 10/2013 | Igarashi | G06F 17/00 701/1 |
| 2015/0149036 | A1* | 5/2015 | You | B60W 30/12 701/1 |
| 2016/0098605 | A1 | 4/2016 | Okada et al. | |
| 2016/0257308 | A1* | 9/2016 | Pawlicki | B60W 30/12 |
| 2016/0280223 | A1* | 9/2016 | Aoki | G06K 9/00798 |
| 2020/0047753 | A1* | 2/2020 | Kato | B60W 30/12 |

FOREIGN PATENT DOCUMENTS

| | | |
|---|---|---|
| EP | 2 879 117 A1 | 6/2015 |
| JP | 9-311999 A | 12/1997 |
| JP | 2005-38225 A | 2/2005 |
| JP | 2012-58984 A | 3/2012 |
| JP | 2014-51241 A | 3/2014 |

OTHER PUBLICATIONS

JPO Office Action for Application No. 2017-538740 dated Sep. 1, 2017.
International Search Report for PCT/JP2017/000405 dated Mar. 14, 2017 [PCT/ISA/210].
Office Action dated Nov. 3, 2021 from the China National Intellectual Property Administration in CN Application No. 201780082347.7.

* cited by examiner $$R^2 = (L_p \times \sqrt{3}/2)^2 + (R - L_p/2)^2$$

$$R^2 = (L_p \times \sin(60+\theta))^2 + (R - L_p \times \cos(60+\theta))^2$$

F I G . 8
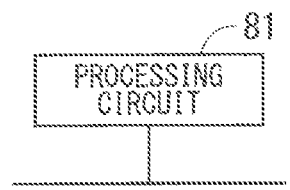
F I G . 9
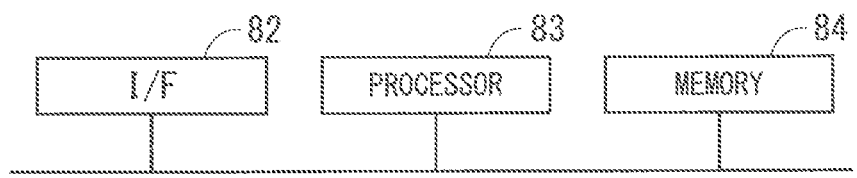

TRAVEL PATH RECOGNITION APPARATUS AND TRAVEL PATH RECOGNITION METHOD

CROSS REFERENCE TO RELATED APPLICATIONS

This application is a National Stage of International Application No. PCT/JP2017/000405, filed on Jan. 10, 2017.

TECHNICAL FIELD

The present invention relates to a travel path recognition apparatus and a travel path recognition method that recognize a travel path on which a vehicle travels.

BACKGROUND ART

A Vehicle including a lane keep assist function uses a travel path recognition apparatus that recognizes a travel path on which the vehicle travels. For example, a travel path recognition apparatus disclosed in Patent Document 1 estimates a traffic lane border based on a sequence of points of traffic-lane candidate points corresponding to a detected traffic lane border, and sets a prediction parameter coefficient after traveling for a set time period based on a sequence of points before traveling for a set time period with respect to calculation time of the current case. Then, the travel path recognition apparatus estimates a traffic lane after traveling for the set time period based on this prediction parameter coefficient. Specifically, according to the travel path recognition apparatus disclosed in Patent Document 1, a prediction parameter coefficient after traveling for a set time period is set based on a sequence of points of previous traffic-lane candidate points, and a traffic lane is estimated based on this prediction parameter coefficient.

PRIOR ART DOCUMENT

Patent Document

Patent Document 1: Japanese Patent Application Laid-Open No. 2012-058984

SUMMARY

Problem to be Solved by the Invention

In the technology described in Patent Document 1 above, if a traffic lane recognition distance cannot be sufficiently secured and a lane marking cannot be detected, such as in a case where a distant view of a driver of a vehicle following a preceding vehicle is blocked by the preceding vehicle, old parameters are used to estimate the lane marking for securing safety. However, Patent Document 1 does not define a usable period of each parameter, or does not especially make a reference to a usable period in which information of a detected traffic lane can be used. Therefore, there is a problem in that the travel path on which the vehicle travels cannot be appropriately recognized.

Accordingly, the present invention has been achieved in view of the problems as described above, and has an object to provide technology capable of appropriately recognizing a travel path.

Means to Solve the Problem

According to the present invention, a travel path recognition apparatus includes a lane marking acquisition unit configured to acquire lane marking information concerning a position and a shape of a lane marking in front of a vehicle with respect to a position of the vehicle, a vehicle behavior acquisition unit configured to acquire vehicle behavior concerning a vehicle speed of the vehicle from acquisition time of the lane marking information to current time, and a travel path recognizer configured to recognize a travel path on which the vehicle travels based on the lane marking information. The travel path recognizer calculates a traveling distance traveled by the vehicle from the acquisition time of the lane marking information to the current time based on the vehicle speed of the vehicle behavior, and determines whether or not the lane marking information is information within a usable period in which the lane marking information is usable to recognize the travel path based on a predetermined lane marking acquirable distance and the traveling distance. The predetermined lane marking acquirable distance is a distance in front of the position of the vehicle, and is a distance in which the lane marking of the lane marking information is acquirable.

Effects of the Invention

According to the present invention, the travel path recognizer calculates a traveling distance traveled by the vehicle from the acquisition time of the lane marking information to the current time based on the vehicle speed of the vehicle behavior, and determines whether or not the lane marking information is information within a usable period in which the lane marking information is usable to recognize the travel path based on a predetermined lane marking acquirable distance and the traveling distance. The predetermined lane marking acquirable distance is a distance in front of the position of the vehicle, and is a distance in which the lane marking of the lane marking information is acquirable. Consequently, the travel path can be appropriately recognized.

These and other objects, features, aspects and advantages of the present invention will become more apparent from the following detailed description of the present invention when taken in conjunction with the accompanying drawings.

BRIEF DESCRIPTION OF DRAWINGS

FIG. 8 is a block diagram illustrating one example of a hardware configuration of the travel path recognition apparatus.

FIG. 9 is a block diagram illustrating one example of a hardware configuration of the travel path recognition apparatus.

DESCRIPTION OF EMBODIMENTS

First Embodiment

Figure 1:
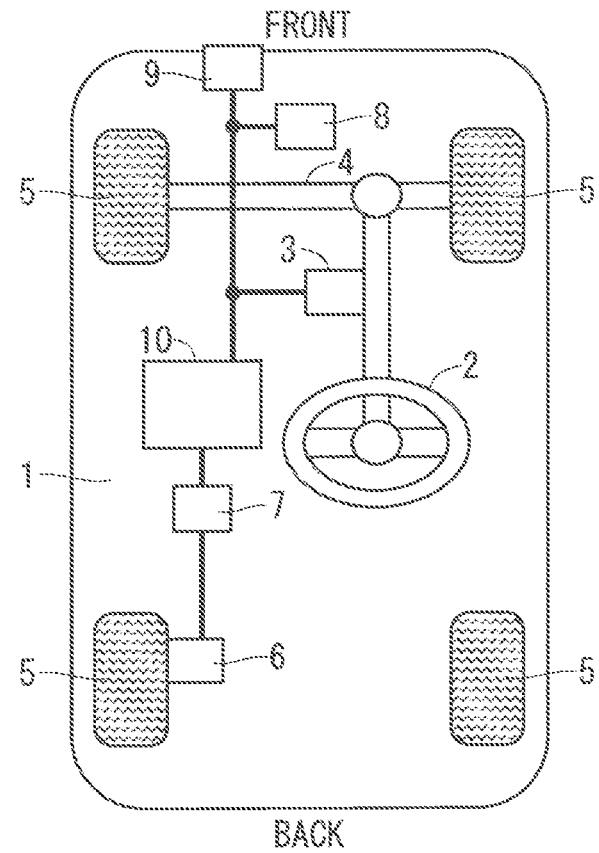
FIG. 1 is a diagram illustrating one example of a configuration of a drive assist device including a control unit.

A travel path recognition apparatus according to a first embodiment of the present invention is implemented by a control unit mounted to a vehicle. FIG. 1 is a configuration diagram illustrating one example of a configuration of a drive assist device including a control unit 10 according to the first embodiment. Note that, in each of the embodiments, the same or similar parts are denoted by the same reference symbols, and overlapping description will be omitted as appropriate.

A steering device 4 steers tires 5 based on behavior of a steering wheel 2 coupled to the steering device 4. A motor 3 is coupled to the steering device 4 similarly to a general electric power steering device. Torque generated by the motor 3 is applied to the steering device 4 as appropriate. The motor 3 is driven based on a target electric current output by the control unit 10.

A wheel speed sensor 6 detects vehicle speed information concerning a vehicle speed of a vehicle 1. As the vehicle speed information, for example, a vehicle speed of the vehicle 1, a traveling distance of the vehicle 1, acceleration of the vehicle 1, or the like is used. The traveling distance is differentiated with respect to time to obtain the vehicle speed. The acceleration is integrated with respect to time to obtain the vehicle speed.

A yaw rate sensor 7 detects yaw rate information concerning a yaw rate of the vehicle 1. As the yaw rate information, for example, a yaw rate of the vehicle 1, a yaw angle of the vehicle 1, a yaw moment of the vehicle 1, or the like is used. The yaw angle is differentiated with respect to time to obtain the yaw rate. The yaw moment is subjected to predetermined calculation to obtain the yaw rate.

A camera 8 is installed near a rear-view mirror inside the vehicle 1, and captures a front-view image of the vehicle 1 through a windshield of the vehicle 1. The front-view image captured by the camera 8 is used to detect lane marking information to be described later in detail.

A millimeter wave radar 9 measures an inter-vehicle distance between a preceding vehicle, which is another vehicle in front of the vehicle 1, and the vehicle 1.

The control unit 10 is directly or indirectly connected to the motor 3, the wheel speed sensor 6, the yaw rate sensor 7, the camera 8, and the millimeter wave radar 9. A signal from each sensor, the front-view image from the camera 8, and the inter-vehicle distance from the millimeter wave radar 9 are input to the control unit 10. The control unit 10 determines a target electric current, which is a drive signal of the motor 3, based on these pieces of input information, and outputs the target electric current to the motor 3. Note that the control unit 10 may include a control function of a general electric power steering device.

Figure 2:
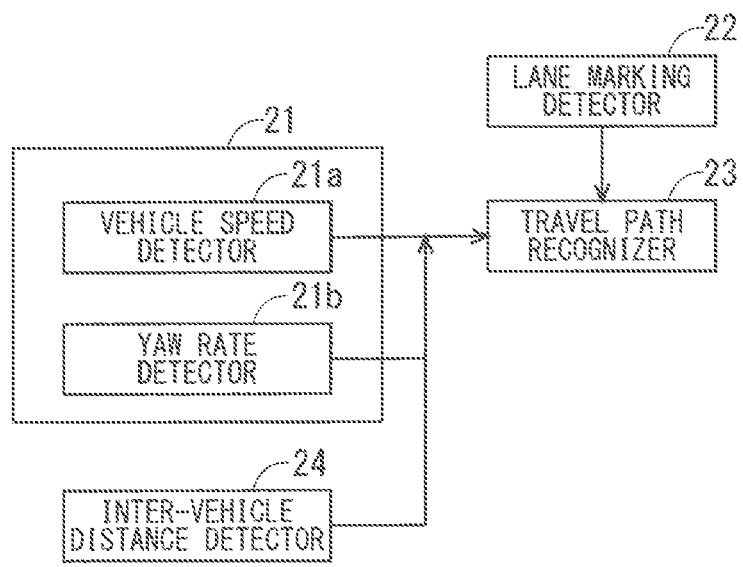
FIG. 2 is a block diagram illustrating a function of a travel path recognition apparatus according to a first embodiment.

FIG. 2 is a block diagram illustrating a function of the travel path recognition apparatus implemented by the control unit 10. A travel path recognition apparatus of FIG. 2 includes a vehicle behavior detector 21, a lane marking detector 22 that detects lane marking information, a travel path recognizer 23, and an inter-vehicle distance detector 24.

The vehicle behavior detector 21 serving as a vehicle behavior acquisition unit includes a vehicle speed detector 21a and a yaw rate detector 21b. The vehicle speed detector 21a detects a vehicle speed of the vehicle 1 on certain occasions from the time when the lane marking detector 22 detects lane marking information to the current time based on the vehicle speed information detected by the wheel speed sensor 6. The yaw rate detector 21b detects a yaw rate of the vehicle 1 on certain occasions from the time when the lane marking detector 22 detects lane marking information to the current time based on the yaw rate information detected by the yaw rate sensor 7.

The vehicle behavior detector 21 configured as described above detects vehicle behavior concerning the vehicle speed and the yaw rate of the vehicle 1 from the detection time of the lane marking information to the current time. The vehicle behavior detector 21 outputs the detected vehicle behavior to the travel path recognizer 23.

The inter-vehicle distance detector 24 serving as an inter-vehicle distance acquisition unit acquires a signal of the inter-vehicle distance between the preceding vehicle and the vehicle 1 detected by the millimeter wave radar 9, and outputs the inter-vehicle distance to the travel path recognizer 23. Note that a configuration of detecting the inter-vehicle distance between the preceding vehicle and the vehicle 1 based on the front-view image captured by the camera 8 may be adopted. In this case, the millimeter wave radar 9 can be omitted, and can thus achieve cost reduction.

The lane marking detector 22 serving as a lane marking acquisition unit detects lane marking information based on data of the front-view image captured by the camera 8, and outputs the detected lane marking information to the travel path recognizer 23 on a 0.1-msec cycle, for example. The lane marking information is information concerning a position and a shape of the lane marking in front of the vehicle 1 with respect to a position of the vehicle 1 at the time of capturing the image. The lane marking information includes, for example, a vehicle-lane marking distance, a vehicle angle, curvature of the lane marking, and a curvature change rate of the lane marking. The vehicle-lane marking distance is a distance between the vehicle 1 and a portion of the lane marking on a side of the vehicle. The vehicle angle is inclination of a traveling direction of the vehicle 1 with respect to the portion of the lane marking.

Here, a detection method of the lane marking information will be described. From the front-view image captured by the camera 8, the lane marking detector 22 extracts lane markings, such as white lines, located on both the right and left sides of a road in the front-view image by using a known method. Then, the lane marking detector 22 calculates curvature and a curvature change rate of the obtained lane markings. The following description is based on an assumption that the calculated curvature change rate is constant within the captured area. In this case, based on the curvature at the image-capture (detection) position and the curvature change rate being constant within the captured area, the lane marking detector 22 calculates the above-mentioned curvature of a portion of the captured lane marking in front of the vehicle 1 with respect to the position of the vehicle 1 at the image-capture time point. Further, the lane marking detector 22 estimates a lane marking extended to the position of the vehicle 1 with an extrapolation method by using a known method. Then, as the above-mentioned vehicle-lane marking distance, the lane marking detector 22 calculates a distance from the position of the vehicle 1 at the image-capture time point to the estimated lane marking. Further, as the above-mentioned vehicle angle, the lane marking detector 22 calculates inclination of the traveling direction of the vehicle 1 at the image-capture time point with respect to the estimated lane marking. Note that the position of the vehicle 1 when the lane marking information is detected may be hereinafter referred to as a "detection position".

The detail of the travel path recognizer 23 will be described later with reference to a flowchart. Thus, a main configuration of the travel path recognizer 23 will now be described.

The travel path recognizer 23 recognizes a travel path on which the vehicle 1 travels based on the lane marking information detected by the lane marking detector 22. Further, the travel path recognizer 23 stores the lane marking information detected by the lane marking detector 22. The lane marking information stored by the travel path recognizer 23 may be hereinafter referred to as "stored lane marking information."

The travel path recognizer 23 does not only store the lane marking information, but also stores vehicle behavior and a lane marking detectable distance that correspond to the lane marking information. Here, the lane marking detectable distance refers to a distance in front of the detection position of the vehicle 1, and to a predetermined distance in which the lane marking of the lane marking information can be detected. Note that the lane marking detectable distance may be referred to as a lane marking acquirable distance. In the first embodiment, the travel path recognizer 23 controls the lane marking detectable distance based on the inter-vehicle distance detected by the inter-vehicle distance detector 24.

When the lane marking information is detected by the lane marking detector 22, the travel path recognizer 23 uses the detected lane marking information to recognize the travel path, and outputs the detected lane marking information to the outside.

On the other hand, when the lane marking information is not detected by the lane marking detector 22, the travel path recognizer 23 uses the stored lane marking information to recognize the travel path. At this time, the travel path recognizer 23 determines whether or not the stored lane marking information is information within a usable period in which the stored lane marking information can be used to recognize the travel path.

Specifically, the travel path recognizer 23 calculates a post-detection traveling distance, which is a traveling distance traveled by the vehicle 1 from the detection time of the lane marking information to the current time, based on the vehicle speed of the vehicle behavior detected by the vehicle behavior detector 21. Then, the travel path recognizer 23 determines whether or not the stored lane marking information is information within the usable period in which the stored lane marking information can be used to recognize the travel path based on the above-mentioned post-detection traveling distance and the above-mentioned lane marking detectable distance.

When the travel path recognizer 23 determines that the stored lane marking information is information within the usable period, the travel path recognizer 23 corrects the stored lane marking information within the usable period into current-position lane marking information based on the vehicle behavior, and uses the current-position lane marking information to recognize the travel path. Note that the current-position lane marking information is information concerning a position and a shape of the lane marking with respect to the current position of the vehicle 1. On the other hand, when the travel path recognizer 23 determines that the stored lane marking information is not information within the usable period, the travel path recognizer 23 discards the stored lane marking information, i.e., erases the stored lane marking information from memory.

<Operation>

Figure 3:
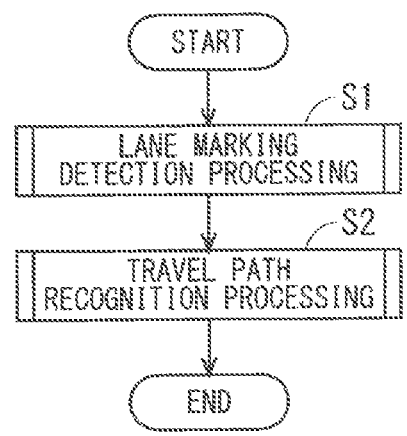
FIG. 3 is a flowchart illustrating operation of the travel path recognition apparatus according to the first embodiment.

FIG. 3 is a flowchart illustrating operation of the travel path recognition apparatus according to the first embodiment. The operation of FIG. 3 is performed on a certain cycle, for example, on a 0.01-second cycle.

First, in Step S1, the lane marking detector 22 performs lane marking detection processing to detect lane marking information. The lane marking detector 22 detects lane marking information including the above-mentioned vehicle-lane marking distance, vehicle angle, curvature, and curvature change rate by using the above-mentioned detection method or the like. Note that, although not illustrated, vehicle behavior is also detected depending on the detection of the lane marking information.

In Step S2, the travel path recognizer 23 performs travel path recognition processing to estimate the above-mentioned current-position lane marking information as estimation lane marking information depending on a condition. Consequently, even when the lane marking information cannot be detected by the lane marking detector 22 due to deterioration in detectability or the like, the travel path recognizer 23 outputs appropriate estimation lane marking information and recognizes the travel path on which the vehicle 1 travels based on the estimation lane marking information. In the first embodiment, the control unit 10 (FIG. 2) implementing the travel path recognition apparatus controls an electric current of the motor 3 based on the travel path recognized by the travel path recognizer 23 to perform known steering angle control. This can optimize a lane keep assist function, which maintains traveling of the vehicle 1 along a portion, such as a center portion between traffic lanes, for example.

Figure 4:
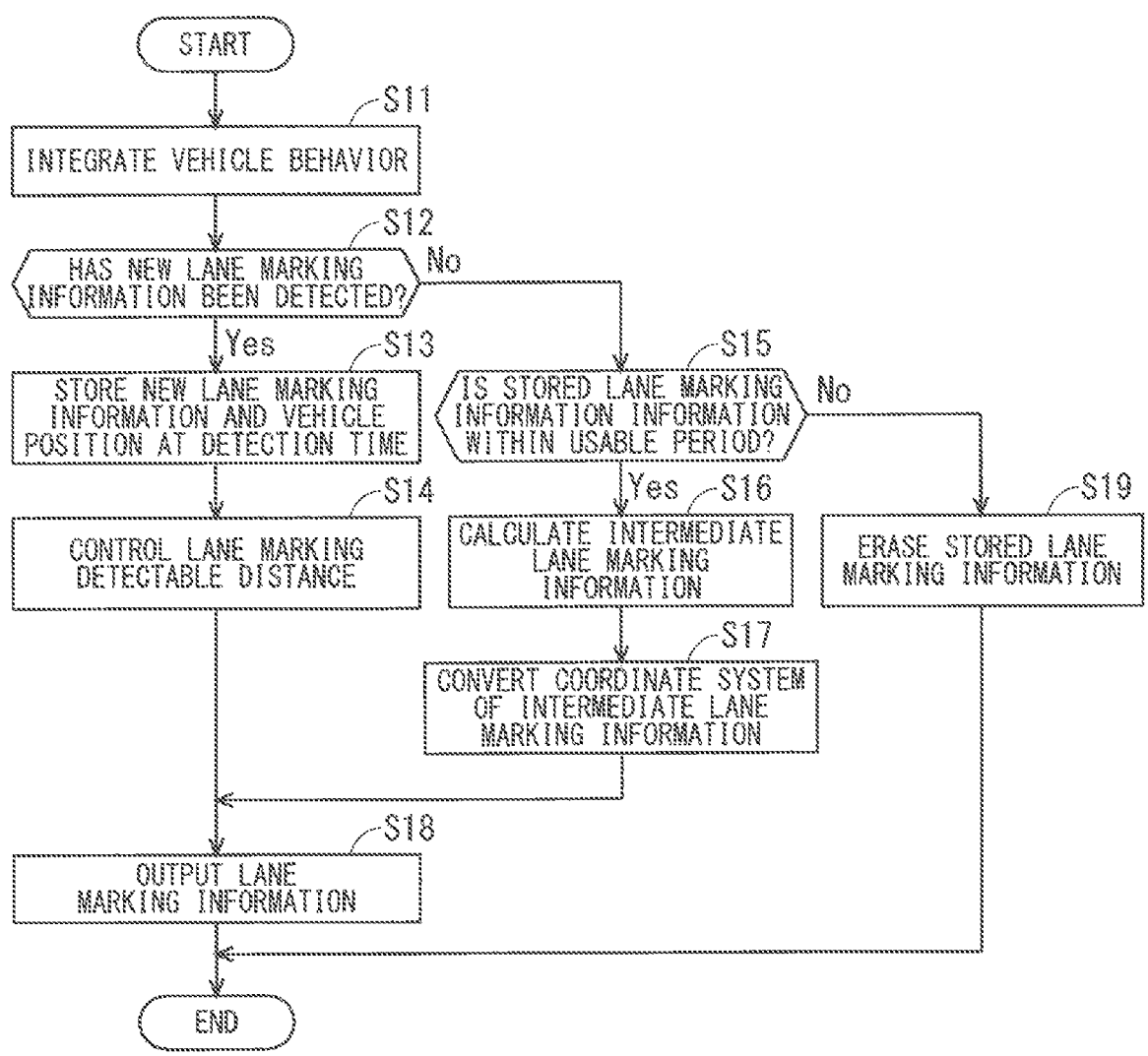
FIG. 4 is a flowchart illustrating operation of the travel path recognition apparatus according to the first embodiment.

FIG. 4 is a flowchart illustrating the detail of the travel path recognition processing in Step S2 of FIG. 3.

First, in Step S11, the travel path recognizer 23 performs vehicle behavior integration that integrates vehicle behavior corresponding to the stored lane marking information. The travel path recognizer 23 integrates the vehicle behavior from the time of detecting the lane marking to the current time for every cycle to acquire a position and a traveling direction of the vehicle 1 that has changed from the detection time to the current time. These pieces of information are used to convert a coordinate system of intermediate lane marking information to be described later, for example.

In Step S12, the travel path recognizer 23 determines whether or not new lane marking information, which is the latest lane marking information obtained by the lane marking detector 22, has been detected. If it is determined that the new lane marking information has been detected, processing proceeds to Step S13. If it is determined that the new lane marking information has not been detected, processing proceeds to Step S15.

In Step S13, the travel path recognizer 23 acquires the new lane marking information and the position of the vehicle 1 at the detection time of the new lane marking information from the lane marking detector 22 etc., and stores the new lane marking information and the position.

Note that, regarding the position of the vehicle 1 at the detection time, influence caused by a time difference between a first time point and a second time point may not be tolerated in some cases. The first time point is a time point when the lane marking detector 22 detects the lane marking. The second time point is a time point when the travel path recognizer 23 acquires the lane marking information. Examples of the cause of such a time difference include a period of time required for the calculation when the front-view image captured by the camera 8 is processed to obtain the lane marking information, a communication delay caused by communication through a communication line such as a controller area network (CAN), etc. For example, when the degree of the time different is such a degree that may be tolerated (e.g., approximately 0.01 sec), the above-mentioned first time point and the above-mentioned second time point may be regarded as an identical time point, and thus a deviation of both of a traveling distance and a vehicle rotation angle caused by the time difference may be 0. On the other hand, for example, when the degree of the time difference is such a degree that may not be tolerated (e.g., approximately 0.1 sec), the vehicle 1 travels several meters during the time period. In such a case, the travel path recognizer 23 may use the acquired position of the vehicle 1 as a position of the vehicle 1 detected 0.1 sec earlier than the acquisition time point. The position of the vehicle 1 earlier than 0.1 sec can be obtained by integrating the vehicle behavior during the 0.1 sec, similarly to Step S11 described above.

In Step S14, the travel path recognizer 23 estimates an area in which the lane marking in front of the vehicle 1 can be detected based on the inter-vehicle distance detected by the inter-vehicle distance detector 24 to control the above-mentioned lane marking detectable distance. The control of the lane marking detectable distance includes setting, changing, and storing the lane marking detectable distance, for example.

Here, when a preceding vehicle does not exist and the inter-vehicle distance is sufficiently long, there is no obstruction to the area in which the lane marking detector 22 can detect the lane marking in front. Therefore, as the lane marking detectable distance, the travel path recognizer 23 sets a maximum distance (e.g., 100 m), in which the lane marking in front of the vehicle 1 can be detected depending on capacity of the camera 8 or the like. At the same time, regarding the lane marking located away from the vehicle 1 by the maximum distance or more, it can be said that the stored lane marking information of the lane marking is not appropriate. Therefore, when the post-detection traveling distance, which is a distance traveled by the vehicle 1 from the detection time of the stored lane marking information, exceeds the lane marking detectable distance, it can be said that accuracy of the stored lane marking information is lowered. Accordingly, as will be described later, when it is determined that the new lane marking information has not been detected and the processing proceeds from Step S12 to Step S15, and the post-detection traveling distance exceeds the lane marking detectable distance, the travel path recognizer 23 erases the stored lane marking information from the memory in Step S9.

When a preceding vehicle exists and the inter-vehicle distance is short, it is assumed that the area in which the lane marking detector 22 can detect the lane marking in front of the vehicle 1 is obstructed by the preceding vehicle and is narrowed. In the first embodiment, information detected by the inter-vehicle distance detector 24 is only an inter-vehicle distance, and a size of the preceding vehicle and a horizontal position in the traffic lane cannot be detected. Accordingly, when the inter-vehicle distance is short, the travel path recognizer 23 sets the inter-vehicle distance between the vehicle and the preceding vehicle as the lane marking detectable distance.

Note that, if the shape of the preceding vehicle and the horizontal position in the traffic lane can be obtained in a configuration of detecting the inter-vehicle distance by using the camera 8 instead of using the millimeter wave radar 9, the travel path recognizer 23 may use those pieces of information to control the lane marking detectable distance. For example, when the preceding vehicle is a small-sized vehicle, the lane marking further in front of the preceding vehicle may be detected in some cases. Thus, it is sufficient to calculate a portion that is not hidden by the preceding vehicle to estimate the area in which the lane marking in front can be detected. In this case, the travel path recognizer 23 may set a distance equal to or greater than the inter-vehicle distance between the vehicle 1 and the preceding vehicle as the lane marking detectable distance. After Step S14, the processing proceeds to Step S18.

If the processing proceeds from Step S12 to Step S15, the travel path recognizer 23 compares the post-detection traveling distance obtained based on the vehicle behavior updated in Step S11 and stored in Step S13 to the lane marking detectable distance controlled in Step S14, and determines whether or not the lane marking information is information within the usable period.

Here, when the post-detection traveling distance is equal to or less than the lane marking detectable distance, the travel path recognizer 23 determines that the lane marking information stored in Step S13 is information within the usable period, and the processing proceeds to Step S16. On the other hand, when the post-detection traveling distance exceeds the lane marking detectable distance, the travel path recognizer 23 determines that the lane marking information stored in Step S13 is not information within the usable period, and the processing proceeds to Step S19.

Figure 5:
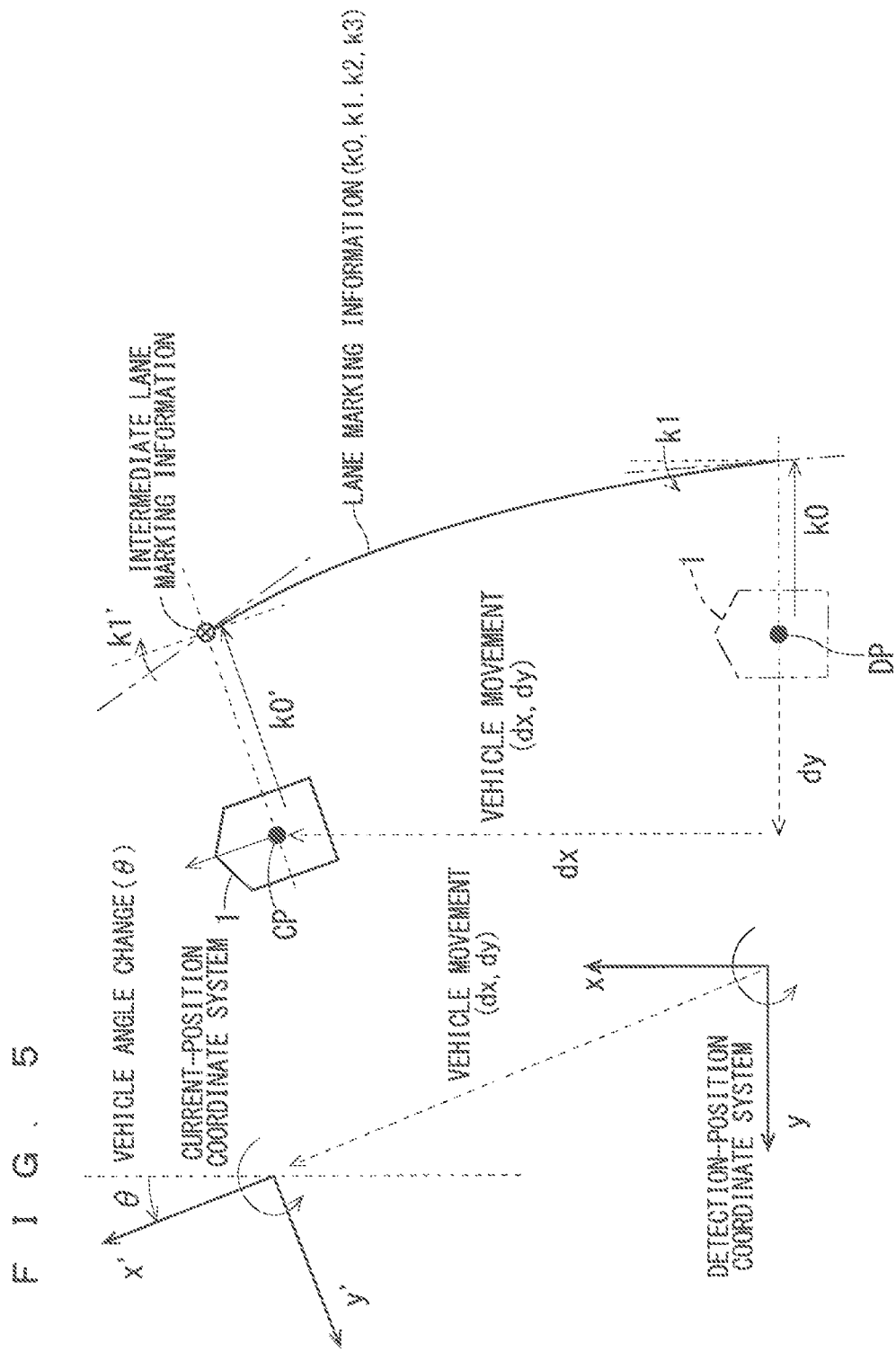
FIG. 5 is a diagram illustrating one example of estimation lane marking information calculation processing of the travel path recognition apparatus according to the first embodiment.

In Steps S16 and S17, the travel path recognizer 23 estimates the current-position lane marking information based on the stored lane marking information within the usable period as the estimation lane marking information. The operation of Steps S16 and S17 will be described below with reference to FIG. 5 illustrating one example of estimation of the estimation lane marking information.

First, in Step S16, the travel path recognizer 23 reads out lane marking information from the stored lane marking information, and calculates intermediate lane marking information based on a vehicle-lane marking distance k0, a vehicle angle k1, curvature k2, and a curvature change rate k3 included in the lane marking information.

Note that the intermediate lane marking information is information in the middle of conversion from lane marking information to current-position lane marking information. Here, the intermediate lane marking information is information concerning a position and a shape of a lane marking in a detection-position coordinate system of a case where the vehicle 1 travels from a detection position DP (FIG. 5) that is a position of the vehicle 1 when the lane marking information is detected to the current position CP (FIG. 5).

The detection-position coordinate system is a coordinate system with respect to the detection position DP. In the example of FIG. 5, as the detection-position coordinate system, an orthogonal coordinate system in which a front-and-back direction and a right-and-left direction of the vehicle 1 at the detection position DP are respectively represented by an x direction and a y direction is used. Since the intermediate lane marking information is information concerning the position and the shape of the lane marking as described above, the intermediate lane marking information includes a vehicle-lane marking distance, a vehicle angle, curvature, and a curvature change rate, similarly to the lane marking information.

Next, operation that the travel path recognizer 23 calculates the intermediate lane marking information will be described.

A vehicle-lane marking distance k0(L), a vehicle angle k1(L), and curvature k2(L) of the lane marking in the detection-position coordinate system when the vehicle 1 travels a distance L [m] from the detection position DP may be calculated by using the following formula (1) including k0 to k2 of the lane marking information. Note that a curvature change rate k3(L) is constant as described above, and is equal to k3.

[Formula 1]

$$k0(L) = k0 + k1 \times L + \frac{1}{2} \times k2 \times L^2 + \frac{1}{6} \times k3 \times L^3 \\ k1(L) = k1 + k2 \times L + \frac{1}{2} \times k3 \times L^2 \\ k2(L) = k2 + k3 \times L$$ (1)

The travel path recognizer 23 calculates a distance from the detection position DP to the current position CP based on an integration value of the vehicle behavior acquired and updated in Steps S11 and S13. Then, the travel path recognizer 23 substitutes the distance for L of the formula (1) above to calculate a vehicle-lane marking distance, a vehicle angle, and curvature of the intermediate lane marking information.

In a strict sense, a deviation corresponding to an inclination amount of the vehicle 1 at the current position CP is generated. However, it is assumed that the vehicle 1 travels at a relatively high speed during operation of the lane keep assist, and thus a deviation of the inclination of the vehicle 1 is hardly generated in actuality. Therefore, in order to calculate the intermediate lane marking information, it is sufficient that a vertical movement amount (dx in FIG. 5), which is a movement amount in the x direction from the detection position DP to the current position CP, be substituted for L. In contrast, when the above-mentioned deviation may not be tolerated due to low-speed traveling and a relatively large steering angle, such as in a case of following a preceding vehicle during traffic congestion, the calculation may be performed in consideration of an inclination amount of the vehicle at the current position CP.

Next, calculation of the vertical movement amount dx based on the integration value of the vehicle behavior will be described. Note that, in addition to the above-mentioned vertical movement amount dx, examples of the values that can be calculated based on an integration value of the vehicle behavior include a horizontal movement amount dy, which is a movement amount in the y direction from the detection position DP to the current position CP, and a vehicle angle change θ, which is an angle formed between the x direction of the detection position DP and the x direction of the current position CP. Such values can be calculated as below.

First, the vehicle angle change θ can be calculated by integrating the yaw rate from the detection time to the current time. The vertical movement amount dx and the horizontal movement amount dy can be calculated by integrating the vehicle speed from the detection time to the current time, and then separating a traveling distance (Svsp) obtained by the integration into an x-direction component and a y-direction component by using the vehicle angle change 9. In a strict sense, an error is generated due to erratic driving or the like also in the vehicle movement distance such as the vertical movement amount dx and the horizontal movement amount dy. However, similarly to the above, it is assumed that the vehicle 1 travels at a relatively high speed, and thus it can be said that the error and influence of the error are trivial. Note that, if θ is small, a calculation load may be reduced as in the following formula (2) by carrying out approximation as sin(θ)≈θ and cos(θ)≈1−θ²/2.

[Formula 2]

$$dx = Svsp \times \cos(\theta) \approx Svsp \times \left(1 - \frac{\theta^2}{2}\right) \\ dy = Svsp \times \sin(\theta) \approx Svsp \times \theta$$ (2)

In view of the above, the travel path recognizer 23 is configured to calculate the vertical movement amount dx based on the integration value of the vehicle behavior acquired and updated in Steps S11 and S13 and substitute the vertical movement amount dx for L of the formula (1) above to calculate the intermediate lane marking information.

Through Step S16 (FIG. 4) described in the above, the travel path recognizer 23 acquires the intermediate lane marking information.

After Step S16, in Step S17, the travel path recognizer 23 converts the coordinate system of the intermediate lane marking information obtained in Step S16 from the detection-position coordinate system with respect to the detection position DP (FIG. 5) to a current-position coordinate system with respect to the current position CP (FIG. 5) to correct the intermediate lane marking information into current-position lane marking information. This enables use of values corresponding to the current position of the vehicle 1 in control, for example.

Note that the current-position lane marking information is information concerning the position and the shape of the lane marking with respect to the current-position coordinate system. In the example of FIG. 5, as the current-position coordinate system, an orthogonal coordinate system in which a front-and-back direction and a right-and-left direction of the vehicle 1 at the current position CP are respectively represented by an x' direction and a y' direction is used. Since the current-position lane marking information is information concerning the position and the shape of the lane marking as described above, the current-position lane marking information includes a vehicle-lane marking distance, a vehicle angle, curvature, and a curvature change rate, similarly to the lane marking information.

Next, operation that the travel path recognizer 23 calculates the current-position lane marking information will be described.

First, regarding the vehicle-lane marking distance of the current-position lane marking information, it is sufficient that k0(dx) be converted from the detection-position coordinate system to the current-position coordinate system by using a known method of converting coordinates. For example, with respect to k0(dx), an amount corresponding to a movement distance (dx, dy) from the detection position DP to the current position CP is deviated, and then an amount corresponding to a vehicle angle change (θ) is rotated. Consequently, a vehicle-lane marking distance k0' of the current-position lane marking information can be obtained. Note that the position of the vehicle 1 in the x direction in the detection-position coordinate system of k0 is dx, and the position of the vehicle 1 in the x' direction in the current-position coordinate system is 0. From the description above, the vehicle-lane marking distance k0' of the current-position lane marking information is expressed as in the following formula (3). Accordingly, the travel path recognizer 23 applies k0(dx) of the intermediate lane marking information and dy and θ calculated based on the vehicle behavior to the following formula (3) to calculate a vehicle-lane marking distance k0' of the current-position lane marking information.

[Formula 3]

$$k0'=(k0(dx)-dy)\times\cos(\theta) \quad (3)$$

The vehicle angle of the current-position lane marking information is angle between the vehicle inclination and the inclination of the lane marking at the detection time in the detection-position coordinate system, and thus needs to be converted to the current vehicle inclination. A change amount of the vehicle inclination from the detection time to the current time is 0, and therefore the vehicle angle of the current-position lane marking information is expressed as in the following formula (4). Accordingly, the travel path recognizer 23 applies k1(dx) of the intermediate lane marking information and θ calculated based on the vehicle behavior to the following formula (4) to calculate a vehicle angle k1' of the current-position lane marking information.

[Formula 4]

$$k1'=k1(dx)-\theta \quad (4)$$

The curvature of the lane marking of the current-position lane marking information is not influenced by inclination of the vehicle 1, and therefore the curvature of the lane marking of the intermediate lane marking information can be used as it is. The curvature of the current-position lane marking information is expressed as in the following formula (5). Accordingly, the travel path recognizer 23 applies k2(dx) of the intermediate lane marking information to the following formula (5) to calculate curvature k2' of the current-position lane marking information.

[Formula 5]

$$k2'=k2(dx) \quad (5)$$

Through Step S17 described in the above, the travel path recognizer 23 acquires the current-position lane marking information and uses the current-position lane marking information as the estimation lane marking information.

If the processing proceeds from Step S14 to Step S18, the travel path recognizer 23 outputs the lane marking information stored in Step S13, and the processing of FIG. 4 ends. If the processing proceeds from Step S17 to Step S18, the travel path recognizer 23 outputs the current-position lane marking information acquired in Step S17, and the processing of FIG. 4 ends.

If the processing proceeds from Step S15 to Step S19, the travel path recognizer 23 determines that accuracy of the lane marking information stored in Step S13 is lowered, and erases the lane marking information from the memory. After that, the processing of FIG. 4 ends.

Gist of First Embodiment

According to the travel path recognition apparatus of the first embodiment as described above, the travel path recognizer 23 determines whether or not the lane marking information is information within the usable period in which the lane marking information can be used to recognize the travel path based on the post-detection traveling distance and the lane marking detectable distance. Therefore, the travel path can be appropriately recognized.

Further, in the first embodiment, the travel path recognizer 23 controls the lane marking detectable distance based on the inter-vehicle distance detected by the inter-vehicle distance detector 24. Consequently, an appropriate lane marking detectable distance can be used, and therefore the travel path can be appropriately recognized.

Further, in the first embodiment, the travel path recognizer 23 uses the lane marking information corrected based on the vehicle behavior to estimate the current-position lane marking information. Therefore, accuracy of the estimation can be enhanced.

Second Embodiment

The travel path recognition apparatus according to the first embodiment is configured such that the lane marking detectable distance is controlled based on the inter-vehicle distance detected by the inter-vehicle distance detector 24. However, the configuration is not limited to the above. The lane marking detectable distance may be controlled based on a road shape as in a travel path recognition apparatus according to a second embodiment of the present invention described below.

Note that a block configuration and operation of the travel path recognition apparatus according to the second embodiment are substantially the same as the block configuration and the operation of the travel path recognition apparatus according to the first embodiment, except for Step S14 (FIG. 4). Accordingly, Step S14 will be mainly described below.

In Step S14 according to the second embodiment, the travel path recognizer 23 controls the lane marking detectable distance based on the curvature of the lane marking included in the lane marking information acquired in Step S13, instead of the inter-vehicle distance detected by the inter-vehicle distance detector 24.

Figure 6:
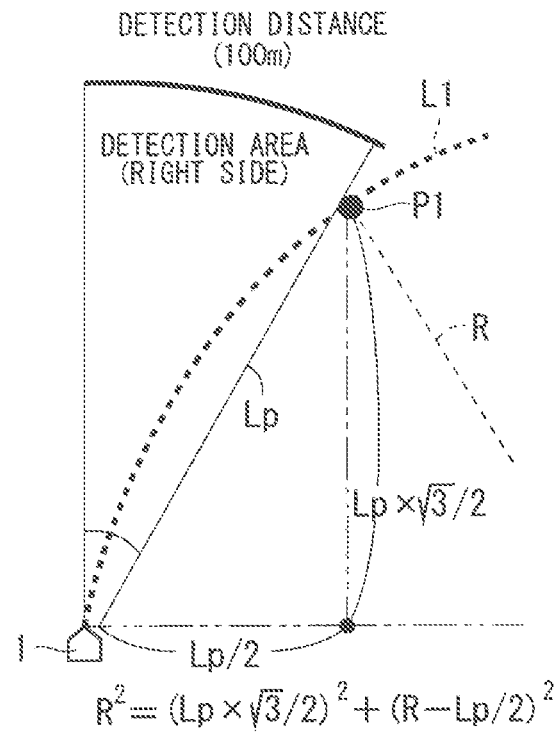
FIG. 6 is a diagram illustrating one example of estimation lane marking information calculation processing of a travel path recognition apparatus according to a second embodiment.

FIG. 6 is a diagram illustrating one example of operation of controlling the lane marking detectable distance based on the curvature of the lane marking.

Note that it is assumed that the camera 8 (FIG. 1) used herein generates distortion or the like at a boundary portion of a viewing angle, i.e., at an image peripheral portion. Further, it is assumed that the image peripheral portion refers to a portion outside of ±30 degrees on the right and left sides (60 degrees on both the sides). In this case, the travel path recognition apparatus according to the second embodiment can detect a lane marking L1 within an area of a circular sector (FIG. 6 illustrates the right half of the circular sector).

It is assumed that the vehicle 1 travels along a tangential direction of the lane marking L1 of a radius of curvature R. When an intersection point P1 between the lane marking L1 and the detection area (on the right side) is located at a position in front of the vehicle 1 by a distance Lp, the distance Lp may be calculated based on the following formula (6) employing the formula of the Pythagorean theorem illustrated in FIG. 6.

[Formula 6]

$$Lp=R \quad (6)$$

The lane marking L1 farther than the intersection point P1 cannot be appropriately detected, and thus the distance Lp can be used as the lane marking detectable distance. Note that Radius of Curvature R=1/(Curvature of Lane Marking) holds. In view of the description above, the travel path recognizer 23 applies the curvature of the lane marking included in the lane marking information acquired in Step S13 to the formula of Lane Marking Detectable Distance=1/ (Curvature of Lane Marking) to control the lane marking detectable distance.

Gist of Second Embodiment

According to the travel path recognition apparatus of the second embodiment as described above, the travel path recognizer 23 controls the lane marking detectable distance based on the curvature of the lane marking. Consequently, an appropriate lane marking detectable distance can be used, and therefore the travel path can be appropriately recognized. Further, in this case, the millimeter wave radar 9 of FIG. 1, the inter-vehicle distance detector 24 of FIG. 2, and the control processing of the lane marking detectable distance based on the inter-vehicle distance of Step S14 of FIG. 4 are unnecessary.

Note that, if necessary, the travel path recognizer 23 may control the lane marking detectable distance based on the inter-vehicle distance detected by the inter-vehicle distance detector 24 and the curvature of the lane marking included in the lane marking information. For example, the travel path recognizer 23 may use a shorter distance of the distance obtained based on the inter-vehicle distance and the distance obtained based on the curvature of the lane marking as the lane marking detectable distance.

Third Embodiment

The travel path recognition apparatus according to the second embodiment is configured such that the lane marking detectable distance is controlled based on the curvature of the lane marking. However, the configuration is not limited to the above. The lane marking detectable distance may be controlled also in consideration of the vehicle angle included in the lane marking information in addition to the curvature of the lane marking as in a travel path recognition apparatus according to a third embodiment of the present invention described below.

For example, in general, the vehicle speed tends to be lower, the curvature larger (a curve sharper), and the vehicle angle with respect to the lane marking larger in a case of preceding-vehicle following control during traffic congestion or the like than in a case of using the lane keep assist function in an expressway. Accordingly, in the third embodiment, the travel path recognizer 23 estimates an area in which the lane marking can be detected also in consideration of the curvature of the lane marking and the vehicle behavior to control the lane marking detectable distance.

Note that a block configuration and operation of the travel path recognition apparatus according to the third embodiment are substantially the same as the block configuration and the operation of the travel path recognition apparatus according to the first embodiment, except for Step S14 (FIG. 4). Accordingly, Step S14 will be mainly described below.

In Step S14 according to the third embodiment, the travel path recognizer 23 controls the lane marking detectable distance based on the curvature of the lane marking included in the lane marking information acquired in Step S13 and the vehicle angle, instead of the inter-vehicle distance detected by the inter-vehicle distance detector 24.

Figure 7:
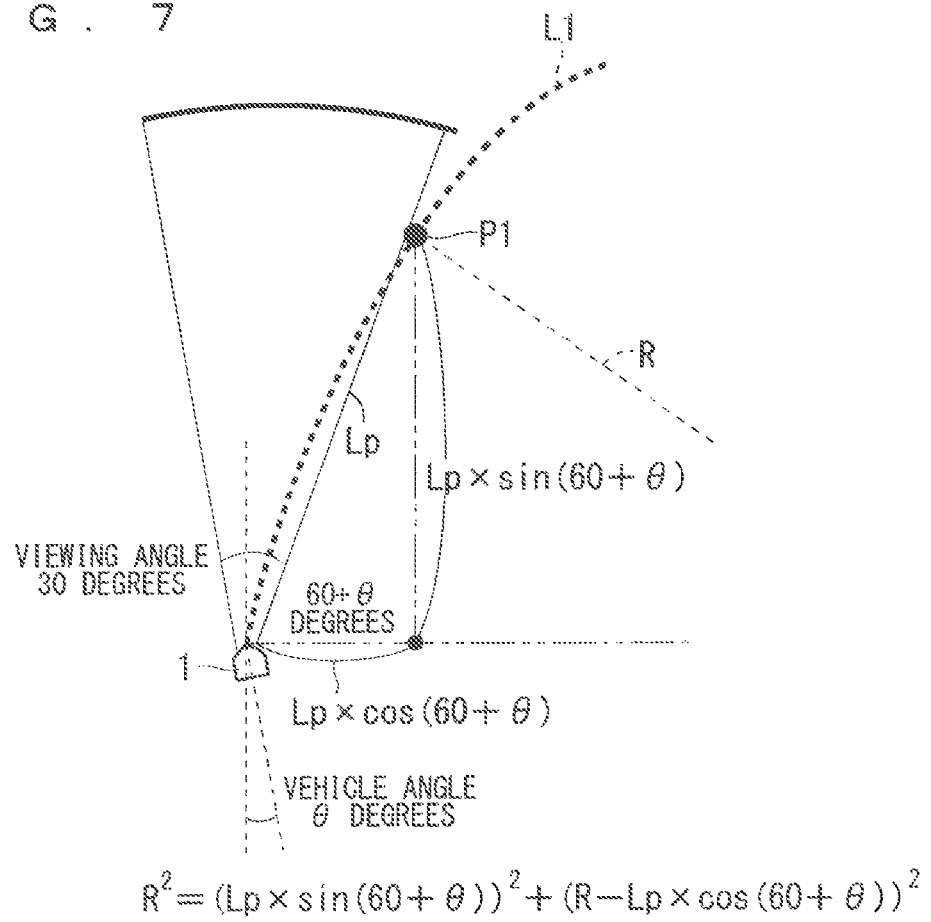
FIG. 7 is a diagram illustrating one example of estimation lane marking information calculation processing of a travel path recognition apparatus according to a third embodiment.

FIG. 7 is a diagram illustrating one example of operation of controlling the lane marking detectable distance based on the curvature of the lane marking and the vehicle angle.

FIG. 7 illustrates a state in which the vehicle angle has been inclined by $\theta$ degrees in a direction that the lane marking L1 and the detection area separate away from each other in the state of FIG. 6. In this case, if the viewing angle is 30 degrees, an angle formed between a radius direction of the lane marking L1 of the vehicle 1 and a direction from the vehicle 1 toward the intersection point P1 is $(60+\theta)$ degrees.

Also in the third embodiment, similarly to the second embodiment, it is assumed that the vehicle 1 travels along the tangential direction of the lane marking L of the radius of curvature R. When the intersection point P1 between the lane marking L1 and the detection area (on the right side) is located at a position in front of the vehicle 1 by the distance Lp, the distance Lp may be calculated based on the following formula (7) employing the formula of the Pythagorean theorem illustrated in FIG. 7.

[Formula 7]

$$Lp = 2 \times \cos(60+\theta) \times R \quad (7)$$

Similarly to the second embodiment, the travel path recognizer 23 applies the curvature of the lane marking included in the lane marking information acquired in Step S13 and the vehicle angle to the formula of Lane Marking Detectable Distance=2×cos(60+Vehicle Angle)/(Curvature of Lane Marking) to control the lane marking detectable distance.

Gist of Third Embodiment

According to the travel path recognition apparatus of the third embodiment as described above, the travel path recognizer 23 controls the lane marking detectable distance based on the curvature of the lane marking and the vehicle angle. Consequently, an appropriate lane marking detectable distance can be used, and therefore the travel path can be appropriately recognized. Further, in this case, the millimeter wave radar 9 of FIG. 1, the inter-vehicle distance detector 24 of FIG. 2, and the control processing of the lane marking detectable distance based on the inter-vehicle distance of Step S14 of FIG. 4 are unnecessary.

Note that, if necessary, the travel path recognizer 23 may control the lane marking detectable distance based on the inter-vehicle distance detected by the inter-vehicle distance detector 24 and the curvature of the lane marking included in the lane marking information. For example, the travel path recognizer 23 may use a shorter distance of the distance obtained based on the inter-vehicle distance and the distance obtained based on the curvature of the lane marking and the vehicle angle as the lane marking detectable distance.

<Modification>

The description above describes a device using results of recognition of a travel path in the lane keep assist, but this is not restrictive. The results of recognition of a travel path may be used in a traffic-lane deviation alarm device, an automated driving device, or the like. The technology described in the embodiments may be applied in each of the devices when lane marking information and a travel path are used.

<Other Modification>

The lane marking acquisition unit, the vehicle behavior acquisition unit, and the travel path recognizer of the travel path recognition apparatus are hereinafter referred to as "lane marking acquisition unit etc." The lane marking acquisition unit etc. are implemented by a processing circuit 81 of FIG. 8 corresponding to the control unit 10 of FIG. 1. Specifically, the processing circuit 81 includes a lane marking acquisition unit that acquires lane marking information, a vehicle behavior acquisition unit that acquires vehicle behavior concerning a vehicle speed of the vehicle 1 from acquisition time of the lane marking information to current time, and a travel path recognizer that recognizes a travel path on which the vehicle 1 travels based on the lane marking information. The processing circuit 81 may use dedicated hardware, or may use a processor to execute a program stored in memory. Examples of the processor include a central processing unit, a processing unit, an arithmetic unit, a microprocessor, a microcomputer, a digital signal processor (DSP), etc.

If the processing circuit 81 is dedicated hardware, examples of the processing circuit 81 include a single circuit, a composite circuit, a programmed processor, a processor for parallel programming, an application specific integrated circuit (ASIC), a field programmable gate array (FPGA), or a combination of these. The function of each part of the lane marking acquisition unit etc. may be implemented by a circuit in which processing circuits are distributed, or the function of each part may be collectively implemented by one processing circuit.

If the processing circuit 81 is a processor, the functions of the lane marking acquisition unit etc. are implemented by a combination with software etc. Note that examples of the software etc. include software, firmware, or software and firmware. Software etc. are described as a program, and are stored in memory. As illustrated in FIG. 9, a processor 83 used in the processing circuit 81 reads out and executes a program stored in memory 84 to implement a function of each part that processes a signal input and output between the processor 83 and an external device, such as the wheel speed sensor 6, the yaw rate sensor 7, the camera 8, and the motor 3 of FIG. 1, via an input-output control interface (I/F) 82. Specifically, the travel path recognition apparatus includes the memory 84 for storing the program that eventually executes a step of acquiring lane marking information, a step of acquiring vehicle behavior concerning a vehicle speed of the vehicle 1 from acquisition time of the lane marking information to current time, and a step of recognizing a travel path on which the vehicle 1 travels based on the lane marking information, when the program is executed by the processing circuit 81. In other words, it can be said that the program makes a computer execute a procedure and a method of the lane marking acquisition unit etc. Here, examples of the memory 84 may include a non-volatile or volatile semiconductor memory, such as random access memory (RAM), read only memory (ROM), flash memory, erasable programmable read only memory (EPROM), and electrically erasable programmable read only memory (EEPROM), a hard disk drive (HDD), a magnetic disk, a flexible disk, an optical disc, a compact disc, a MiniDisc, a digital versatile disc (DVD), a drive device therefor, and any storage medium that may be used ahead.

In the above, a configuration in which each function of the lane marking acquisition unit etc. is implemented by any one of hardware and software etc. is described. However, the configuration is not limited to the above, and a configuration in which a part of the lane marking acquisition unit etc. is implemented by dedicated hardware and another part is implemented by software etc. may be adopted. For example, the function of the lane marking acquisition unit and the vehicle behavior acquisition unit may be implemented by a processing circuit as dedicated hardware, such as a receiver. The function of other parts may be implemented by the processing circuit 81 as the processor 83 reading out and executing the program stored in the memory 84.

In this manner, the processing circuit 81 may implement the above-mentioned each function by hardware, software etc., or a combination of these.

Further, the travel path recognition apparatus described above may also be used in a travel path recognition system constructed as a system achieved by appropriately combining a navigation device such as a portable navigation device (PND), a communication terminal including a portable terminal such as a mobile phone, a smartphone, and a tablet, a function of an application installed in these devices, and a server. In this case, each function or each component of the travel path recognition apparatus described above may be distributed in each device that constructs the above-mentioned system, or may be centralized in any of the devices.

Note that, in the present invention, each of the embodiments and each of the modifications may be freely combined, and each of the embodiments and each of the modifications may be modified or omitted as appropriate within the scope of the present invention.

While the invention has been shown and described in detail, the foregoing description is in all aspects illustrative and not restrictive. It is therefore understood that numerous unillustrated modifications can be devised without departing from the scope of the invention.

EXPLANATION OF REFERENCE SIGNS 1 vehicle, 21 vehicle behavior detector, 22 lane marking detector, 23 travel path recognizer, 24 inter-vehicle distance detector

The invention claimed is:

1. A travel path recognition apparatus comprising at least one processor configured to:
　acquire lane marking information concerning a position and a shape of a lane marking in front of a vehicle with respect to a position of the vehicle, at an acquisition time;
　acquire vehicle behavior concerning a vehicle speed of the vehicle from the acquisition time of the lane marking information to a current time; and
　recognize a travel path on which the vehicle travels based on the lane marking information, wherein
　the at least one processor is further configured to:
　　calculate a traveling distance traveled by the vehicle from the acquisition time of the lane marking information to the current time based on the vehicle speed of the vehicle behavior,
　　determine that the lane marking information is information within a usable period in which the lane marking information is usable to recognize the travel path when the traveling distance is equal to or less than a predetermined lane marking acquirable distance, the predetermined lane marking acquirable distance being a distance in front of the position of the vehicle, and being a distance in which the lane marking of the lane marking information is acquirable,
　　in response to a first determination that the lane marking information is the information within the usable period, obtain intermediate lane marking information, based on the lane marking information, convert the intermediate lane marking information to current-position lane marking information based on the vehicle behavior, and control a steering device of the vehicle to perform a driving assist function at the current time, based on the lane marking information that was previously acquired at the acquisition time.

2. The travel path recognition apparatus according to claim 1, wherein the at least one processor is further configured to:
- acquire an inter-vehicle distance between a preceding vehicle and the vehicle, the preceding vehicle being another vehicle in front of the vehicle, and
- control the lane marking acquirable distance based on the inter-vehicle distance.

3. The travel path recognition apparatus according to claim 1, wherein
- the lane marking information includes curvature of the lane marking, and
- the at least one processor is further configured to control the lane marking acquirable distance based on the curvature.

4. The travel path recognition apparatus according to claim 1, wherein
- the lane marking information includes curvature of the lane marking, and a vehicle angle, the vehicle angle being inclination of a traveling direction of the vehicle with respect to a portion of the lane marking on a side of the vehicle, and
- the at least one processor is further configured to control the lane marking acquirable distance based on the curvature and the vehicle angle.

5. The travel path recognition apparatus according to claim 1, wherein
- the vehicle behavior includes behavior concerning a yaw rate of the vehicle from the acquisition time of the lane marking information to the current time, and
- the at least one processor is further configured to use the current-position lane marking information to recognize the travel path, the current-position lane marking information concerning the position and the shape of the lane marking with respect to a current position of the vehicle.

6. The travel path recognition apparatus according to claim 1, wherein
- the at least one processor is further configured to obtain the intermediate lane marking information, based on a vehicle-to-lane marking distance at the acquisition time, a vehicle angle at the acquisition time, and a curvature of the lane marking that are included in the lane marking information.

7. The travel path recognition apparatus according to claim 1, wherein
- the at least one processor is further configured to discard the lane marking information, in response to a second determination that the lane marking information is not the information within the usable period.

8. The travel path recognition apparatus according to claim 1, wherein
- the intermediate lane marking information is converted to current-position lane marking information based on a vehicle angle change, a vertical movement and a horizontal movement of the vehicle from the acquisition time of the lane marking information to the current time.

9. The travel path recognition apparatus according to claim 1,
wherein the at least one processor is further configured to:
- in response to the first determination that the lane marking information is the information within the usable period, obtain the intermediate lane marking information, based on a vehicle-to-lane marking distance, a vehicle angle, a curvature of the lane marking, and a curvature change rate of the lane marking that are included in the lane marking information, convert the intermediate lane marking information to the current-position lane marking information based on the vehicle speed from the acquisition time of the lane marking information to the current time, and control the steering device of the vehicle to perform the driving assist function at the current time, based on the current-position lane marking information that is converted from the intermediate lane marking information, wherein the lane marking acquirable distance is adjusted based on at least one of the inter-vehicle distance, the curvature of the lane marking, and the vehicle angle.

10. A travel path recognition method comprising:
- acquiring lane marking information concerning a position and a shape of a lane marking in front of a vehicle with respect to a position of the vehicle, at an acquisition time;
- acquiring vehicle behavior concerning a vehicle speed of the vehicle from the acquisition time of the lane marking information to a current time; and
- recognizing a travel path on which the vehicle travels based on the lane marking information, wherein the recognizing of the travel path includes:
- calculating a traveling distance traveled by the vehicle from the acquisition time of the lane marking information to the current time based on the vehicle speed of the vehicle behavior,
- determining that the lane marking information is information within a usable period in which the lane marking information is usable to recognize the travel path when the traveling distance is equal to or less than a predetermined lane marking acquirable distance, the predetermined lane marking acquirable distance being a distance in front of the position of the vehicle, and being a distance in which the lane marking of the lane marking information is acquirable,
- in response to a first determination that the lane marking information is the information within the usable period, obtaining intermediate lane marking information, based on the lane marking information, converting the intermediate lane marking information to current-position lane marking information based on the vehicle behavior, and controlling a steering device of the vehicle to perform a driving assist function at the current time, based on the lane marking information that was previously acquired at the acquisition time.

11. The travel path recognition method of claim 10
wherein the obtaining the intermediate lane marking information comprises:
- in response to the first determination that the lane marking information is the information within the usable period, obtaining the intermediate lane marking information, based on a vehicle-to-lane marking distance, a vehicle angle, a curvature of the lane marking, and a curvature change rate of the lane marking that are included in the lane marking information, converting the intermediate lane marking information to the current-position lane marking information based on the vehicle speed from the acquisition time of the lane marking information to the current time, and controlling a steering device of the vehicle to perform the driving assist function at the current time, based on the current-position lane marking information that is converted from the intermediate lane marking information, and wherein the lane marking acquirable distance is adjusted based on at least one of the inter-vehicle distance, the curvature of the lane marking, and the vehicle angle.

\* \* \* \* \*